May 7, 1946.　　　　F. W. PRESTON　　　　2,399,825
METHOD OF FORMING STRUCTURAL GLASS
Original Filed March 7, 1942　　　3 Sheets-Sheet 3
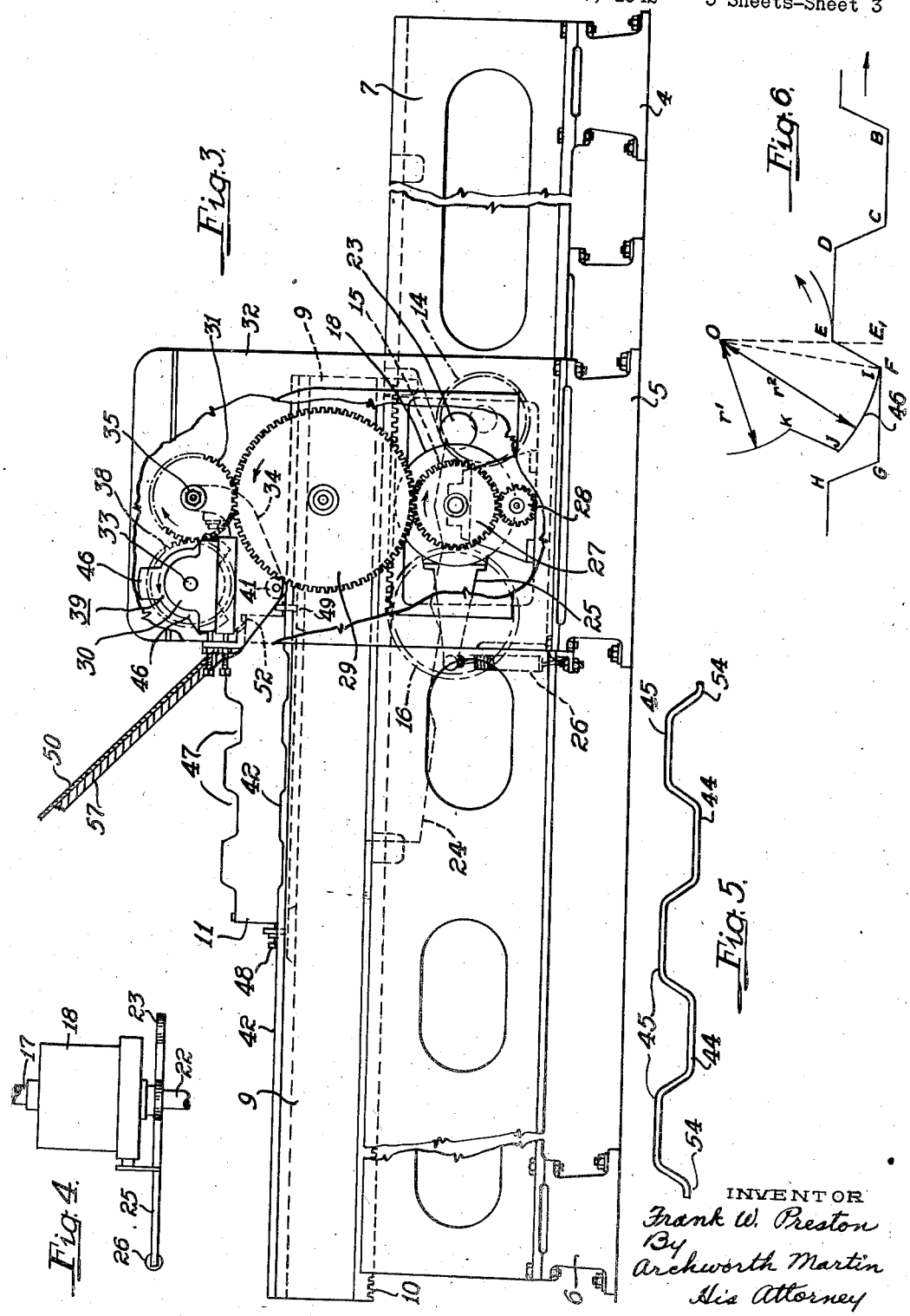
INVENTOR
Frank W. Preston
By Archworth Martin
His Attorney Patented May 7, 1946

2,399,825

UNITED STATES PATENT OFFICE 2,399,825

METHOD OF FORMING STRUCTURAL GLASS

Frank W. Preston, Butler, Pa.

Original application March 7, 1942, Serial No. 433,798, now Patent No. 2,342,218, February 22, 1944. Divided and this application March 19, 1943, Serial No. 479,690

12 Claims. (Cl. 49—84)

My invention relates to the forming of structural shapes and the like from sheet glass or other plastic materials, and is a division from my application, Serial No. 433,798, filed March 7, 1942 (now Patent 2,342,218).

One object of my invention is to provide a structural form of glass which may have a reinforcing mesh of wire after the manner of wire glass, or with the reinforcement omitted therefrom, which is better suited for use as a window or light-transmitting closure in a wall or roof than are various forms of glass panels or the like heretofore employed, and which is of greater strength than various other forms of glass panels such as the common corrugated glass.

Another object of my invention is to provide a method of forming a flat sheet of glass to a structural shape, by bending operations, while maintaining a uniform thickness of the glass throughout all portions of the shape, and without distortion of any surface portions of the glass through friction or "drag" by any of the shaping implements.

Figure 1:
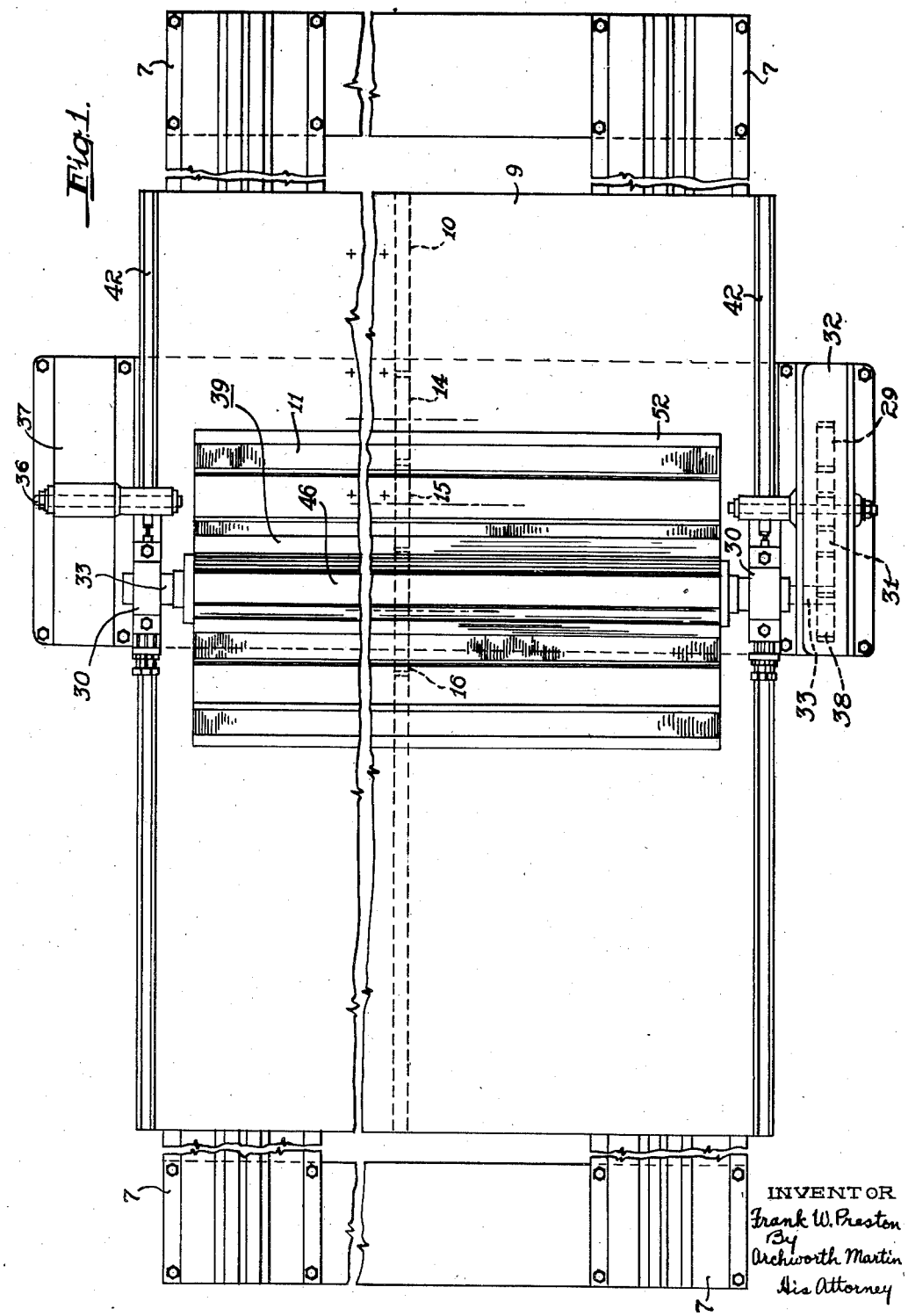
Figure 2:
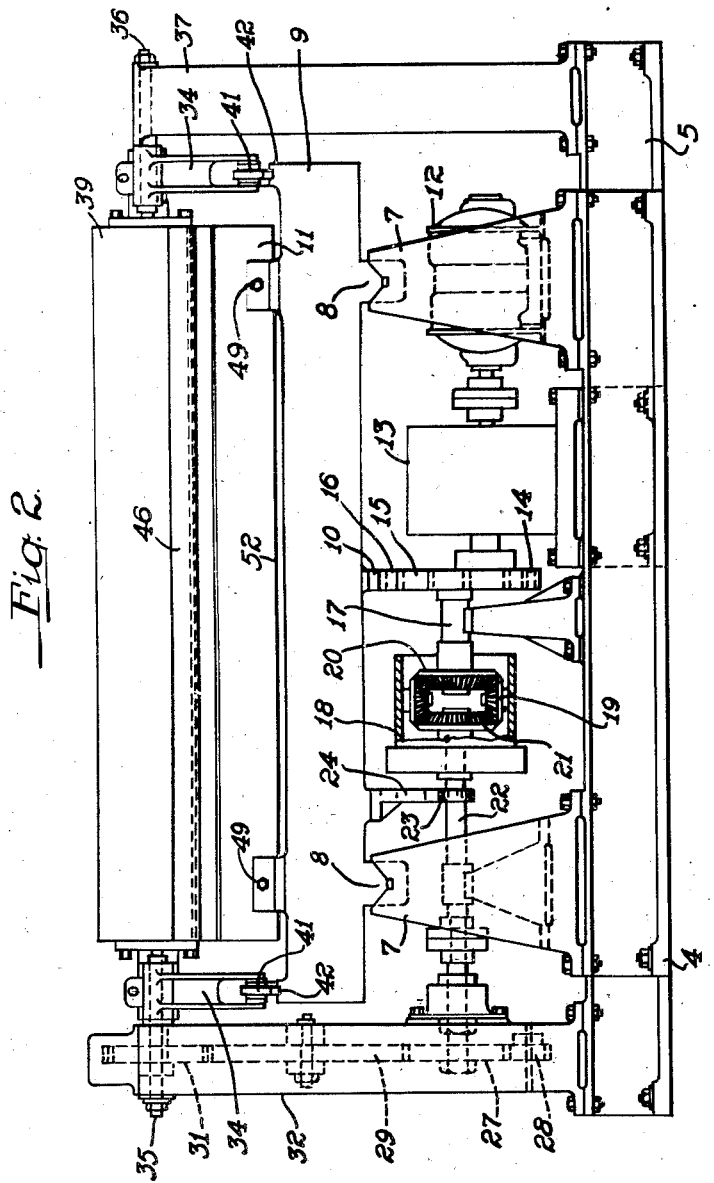

In the accompanying drawings, Figure 1 is a plan view of apparatus for practicing my invention; Fig. 2 is a view thereof partly in end elevation and partly in section; Fig. 3 is a view of the apparatus partly in side elevation and partly in section; Fig. 4 is a plan view of a portion of the apparatus of Fig. 3; Fig. 5 is an edge view on an enlarged scale of a structural glass element formed by the machine, and Fig. 6 is a diagrammatic view, used for the purpose of explaining certain features of operation.

Foundations 4, 5 and 6 are provided for base members 7 having slideways formed therein for slidably supporting runners 8 of a cradle 9 that has a rack 10 secured to its under surface and carries a table 11.

A reversible electric motor 12 is employed to move the cradle back and forth on the slideways, and to drive a crimping roller. The motor operates through reduction gearing in a box 13, to drive a gear wheel 14 which meshes with a gear wheel 15 that drives a gear wheel 16 which meshes with the rack 10.

The gear wheel 15 is secured to a shaft 17 of a differential gear wheel 20. The differential gearing has a casing 18 that carries the pinions 19 and is oscillatable by means to be described. The other differential gear wheel 21 is mounted on a shaft 22. The casing 18 has an extension that carries a roller 23 which engages a cam track 24 that is secured to the underside of the cradle 9. Another extension 25 of the casing 18 is yieldably urged downwardly by a spring 26, to bias the casing in a counter-clockwise direction and thus yieldably hold the roller 23 against the cam track 24.

The shaft 22 carries at its outer end a pinion 27 that engages a gear 28, for picking up oil from a pool and oiling the pinion 27. The pinion 27 meshes with a gear wheel 29 that drives a gear wheel 31. The gear wheels 27, 28, 29 and 31 are all journaled in a housing 32 which is partly broken away in Fig. 3. A shaft 33 is journaled in bearings 30 that are adjustably mounted on rocker arms or brackets 34 that are respectively pivotally supported by the shaft 35 of the gear wheel 31 and a shaft 36 on a standard 37. The shaft 33 carries a gear wheel 38 and a crimping roll 39.

The rocker arms 34 carry rollers 41 that ride on cam tracks or trangs 42 that are affixed to the cradle 9, so that as the cradle is moved by the rack and pinion, the crimping roll will be raised and lowered in an arc around the shafts 35 and 36 as an axis, the radius of movement being such that driving engagement is maintained between the gear wheels 31 and 38.

The table 11 has depressed and raised areas extending transversely thereof to which a hot glass sheet is shaped to form the crenel and merlon portions 44 and 45, respectively, (Fig. 5). The roll 39 has three rib-like crenel-forming portions 46 that extend lengthwise thereof in order to depress the glass into the recesses 47 in the table. The ribs 46 are each of greater radial dimension than the depth of the crenel depressions 47 of the table, in order that they will snugly push the glass into the corners of the depressions. The table 11 is longitudinally adjustable on the table 9, by screws 48 and 49, with respect to the crimping roll and the cam rails 42.

The experience of the industry in making corrugated glass has been that there is no true or accurate rolling, because of the different angular speeds of those portions of the corrugating rollers that engage the glass. Consequently there is scuffing and marring of the glass.

It will be obvious that if my table 11 and cradle 9 are driven at constant speed during the crenelating process, then in the absence of any differential mechanisms, the roller 39 would rotate at uniform angular speed, and since if its periphery is fluted, and various parts of said surface lie at very different distances from its axis, the peripheral speeds of these surface areas would be different, and some of them could not synchronize with the linear speed of the table.

As the motor is operated to move the cradle 9 and table 11 from the position of Fig. 3 toward and past that shown in Fig. 1, the cam rails 42 cause raising and lowering of the roll 39 and its gear wheel 38, so that the ribs 46 will press the glass snugly into the corners of the troughs or crenels. Reference to Fig. 6 will indicate the necessity for this raising and lowering of the roll. As shown, the width of the crenels C—B and F—G is the same as the width of the merlons D—E. When the relative traveling movement of the roll and the table brings the roll center O directly above the point E, the corner I of the rib 46 must enter the corner at F to press the glass therein. This result could not be attained if there were a pure rolling movement of the rib 46 on the sloping surface of the table at E—F after the manner in which gear teeth function. In the case of gear teeth, clearance is provided at their roots and tops, to permit of pure rolling movement. I desire to avoid such clearance (except for glass thickness), so as to pin the glass snugly into the crenel corners at F and G, and to do so without scuffing. To accomplish this, I make the surfaces at E—F, K—J and G—H straight, and roll the glass on the surface D—E, on radius O—E (r—1) and then immediately transfer the rolling action to surfaces J—I and G—F, with the radius O—F (r—2). Since the distance O—F is greater than O—E¹, the center O of the roll must be caused to rise as above explained, when the rolling action is transferred from the merlon areas to the crenel-forming areas.

This raising and lowering of the rocker arms 34 causes the gear wheel 38 to tend to roll on the gear wheel 31, thus giving a certain differential speed to the gear wheel and the roller. This differential movement results in asynchronous speeds as between the table 11 and roll 39. In order to compensate for these variable speeds of the roll and to synchronize rolling or angular speeds of the crenel and merlon-forming areas of the roll, with table speed, the cam track 24 is employed. This track is so contoured that each time the rails 42 raise the roll 39, the cam track 24 will rock the differential housing 18 slightly in a counterclockwise direction, to thereby temporarily reduce the speed of the shaft 22 and hence that of the gear wheel 31, as when rolling the crenel at F—G. The cam track 24 has its camming surfaces so proportioned that such reduction in speed of the gear wheel 31 also compensates for the slight temporary change in speed of the gear wheel 38 and the roll 39 relative to the gear wheel 31, during such raising movement. Similarly, when the cam rails 42 lower the roll 39, the cam track 24 rocks the differential housing 18 to momentarily increase the speed of the gear wheel 31, thus maintaining synchronism between table speed and peripheral speed of the roll during forming of a merlon. The spaced relation of the roll to the table and the rate of rotation of the roll are at all times such that the roll will not cause any change in the original thickness of the glass sheet, the glass being simply pressed or rolled to the contour of the table, and without any stretching or thickening of the glass at the bends or elsewhere.

In the operation of shaping a sheet of glass, the cradle 9 and the table 11 carried thereby are moved to the left by operation of the motor 12 in one direction, to the position shown in Fig. 3. Thereupon, a glass sheet 50 heated to a temperature of 1600° F. or other suitable temperature at which it can be bent, is placed on an inclined supporting element 51 which is at approximately 45° inclination, so that the glass will slide down the same under gravity. The lower forward edge of the glass is caused to engage a rib 52 on the table 11, whereupon the motor 12 is caused to operate in the reverse direction to move the cradle 9 toward and past the position shown in Fig. 1. During this movement, the crimping roller 39 is constantly rotated at variable speeds and is periodically slightly raised and lowered, as above described, to cause the glass sheet to conform to the contour of the table top. When the cradle has advanced far enough to move the table from beneath the roll 39 and past the housing 32, the motor is stopped and the glass shape can be pushed laterally into an annealing lehr, it being understood that the glass has become cool (perhaps 1000° F. to 1200° F.) enough to permit such removal without deformation. The glass sheet 50 may initially be formed in any suitable manner, with or without the inclusion of reinforcing mesh therein and may be preliminarily trimmed to size or not.

In forming structural elements, the sides of whose troughs are somewhat steeply sloped as in the present instance, to form an economical shape wherein larger portions of the glass (as represented by the crenels 44 and merlons 45) are farther from the neutral axis of bending, with consequent greater structural strength than if the sides of the troughs were less steeply inclined, it is desirable to use a crimping roller having no more than four ribs such as 46, since a greater number of ribs would tend to foul or stretch the glass before it reaches the place of contouring.

If the glass sheet is initially of substantially greater than 1600° F. or 1650° F., it can be caused to sag into depressions such as 47 in a table top, without the necessity of being pressed therein by a crimping roll. In such case, the table will be moved at variable rates of speed, so that when the glass is sagging into the depressions 47, the table will be moved more slowly than when the glass is settling upon the flat bottoms of the depressions 47, and the speed of the table movement will be further slightly increased when the glass is being brought into engagement with the rear walls of the depressions 47, so as to maintain the glass at uniform thickness.

The structural shape, as shown in Fig. 5, will have longitudinal flange portions 54 of desired width whereby it may be connected to structural framework, it being understood that the ends of the channel-like portions will be suitably sealed as is common in the building art. These flanges 54 can be made of various widths to permit cutting away portions thereof to fit various spacings in structural framework. When the shape is used in a skylight, it will be placed with the edge portions 54 uppermost, so that rain will be directed away from the joints at such edges.

Structural glass elements made as shown in Fig. 5 have greater strength by reason of the fact that the major portion of the glass is present in the crenels 44 and merlons 45, which are offset substantial distances from the neutral axis of the bending stresses. For example, the distance between the opposite faces of the element may be five times the thickness of the glass sheet.

The plate can initially be formed while in a very plastic condition, by a rolling operation and simultaneously incorporating a wire mesh therein, in the usual manner. Then while still in a somewhat plastic condition, it can be pushed down the incline 57 to the table and given its structural contour. After this shaping operation and when cooled to perhaps 1000° F. it will be pushed from the table in a sidewise direction (which direction is longitudinally of the element) into an annealing lehr. This makes for rapid operation, without the necessity of reheating the plate. By forming the flanges or depressed portions 54 (Fig. 5) at the lower plane of the sheet as it is placed on the table, these portions can engage the supporting surface to which the sheet is removed from the table, while still hot, and thereby held against sagging.

The bending of sheets in the manner described herein is of advantage not only because thickening and thinning at the bends is avoided, but because reinforcement mesh that may be incorporated therein will be maintained at its proper depth or plane with respect to the sheet surfaces, and without serious disturbance of the intimate engagement as between the reinforcement and the plastic sheet.

While the invention has herein been described as employed in the forming of structural glass, it will be understood that certain features thereof such as the shifting of the roll perpendicularly to the table and the changing of roll speeds could advantageously be employed in connection with the shaping of other materials such as hot steel sheets, plastic clay and the like.

I claim as my invention:

1. The method of forming structural glass and the like, which comprises taking a glass plate which is at sufficiently high temperature to be plastic, first placing only the forward edge thereof upon a table that has depressed areas extending crosswise thereof, and bringing the remaining portions of the glass successively into engagement with the table while bending the glass to the contour of the depressions, the glass being maintained at such temperature and deposited upon the table at such rate as to avoid substantial changes in thickness of the plate as a result of the bends formed therein.

2. The method of forming structural glass and the like, which comprises taking a glass plate which is at sufficiently high temperature to be plastic, placing the glass in an inclined plane relative to a table that has depressed areas extending crosswise thereof, with the forward edge of the glass on the table, bringing the remainder of the glass plate gradually into engagement with the table, by progressively moving it along the inclined plane and into approximate parallelism with the table, the rate of movement and the plasticity of the glass being such that portions of the glass will assume the contours of the said depressed areas.

3. The method of forming structural glass and the like, which comprises taking a glass plate which is at sufficiently high temperature to be plastic, first placing only the forward edge of the glass upon a table that has depressed areas, moving the other portions of the plate to the table, and pressing the glass into said areas, successively, at such variable speeds of progressive bending in each area, relative to the said movement of the plate, that the thickness of the plate is not substantially changed as the result of the bending thereof.

4. The method of forming structural glass and the like, which comprises taking a glass plate which is at sufficiently high temperature to be plastic, supporting the plate in an inclined position, placing the forward edge thereof on the forward edge of a table that has depressions extending crosswise thereof, and bringing the plate into parallelism with the table while bending it to the contour of the depressions, successively.

5. The method of forming structural shapes and the like of plastic sheets that are of a plasticity sufficient to sag of their own weight and are subsequently hardenable, which comprises supporting a plastic sheet in an inclined position, placing the forward edge thereof on the forward edge of a table that has depressions extending crosswise thereof, and bringing the sheet into parallelism with the table at such rate that portions thereof will successively sag to the contour of the depressions.

6. The method of forming structural shapes and the like of plastic sheets that are of a plasticity sufficient to sag of their own weight and are subsequently hardenable, which comprises supporting a plastic sheet in an inclined position, placing the forward edge thereof on the forward edge of a table that has depressions extending crosswise thereof, and bringing the sheet into parallelism with the table at such variable rate that portions thereof will sag to the contour of the depressions, without substantial change in thickness.

7. The method of forming structural shapes and the like of plastic sheets that are subsequently hardenable, which comprises supporting a sheet in an inclined position, with its forward edge on the forward edge of a table that extends beneath the sheet and which has depressions extending crosswise thereof, and bringing the sheet into parallelism with the table, while bending it to the contour of the depressions, successively.

8. The method of forming structural shapes and the like of plastic sheets that are subsequently hardenable, which comprises supporting a sheet in an inclined position, with its forward edge on the forward edge of a table that extends beneath the sheet and which has depressions extending crosswise thereof, and imparting forward movement to the table and the sheet relative to the zone at which the sheet is supported, to bring the sheet into parallelism with the table, while bending it to the contour of the depressions, successively.

9. The method which comprises placing a reinforcement mesh of flexible material in a plastic sheet which is of subsequently hardenable material, first placing only the forward edge of the reinforced sheet on the forward edge of a table that has depressed areas extending crosswise thereof, and bringing the remaining portions of the sheet against the table while successively bending portions thereof to the contour of each depression in succession and, at such rate as to avoid substantial changes in the thickness of the sheet.

10. The method of forming structural shapes and the like of plastic sheets which are of a plasticity sufficient to be bent and are subsequently hardenable, which comprises placing a portion of a plastic sheet on a table that has depressed areas extending crosswise thereof, and with the sheet engaging a single raised area of the table, that defines one side of a depressed area, and bringing remaining portions of the sheet progressively into engagement with other raised areas, in sequence while bending it to the contours of the depressed areas, successively.

11. The method of forming structural shapes and the like of plastic sheets which are of a plasticity sufficient to be bent and are subsequently hardenable, which comprises imbedding a reinforcement material in a sheet, placing a portion of the sheet in a plastic condition on a table that has depressed areas extending crosswise thereof, and with the sheet engaging a single raised area of the table, that defines one side of a depressed area, and bringing remaining portions of the sheet progressively into engagement with other raised areas, in sequence while bending it to the contours of the depressed areas, successively.

12. The method of forming structural shapes and the like of plastic sheets that are of a plasticity sufficient to be bent and are subsequently hardenable, which comprises placing the forward edge thereof in a depression of a table that has depressions and raised areas extending crosswise thereof, bringing the remaining portions of the sheet progressively into engagement with the table while bending it to the contour of the depressions, in sequence, the sheet being depressed also at its rear edge, and shifting the formed sheet laterally, to remove it from the table.

FRANK W. PRESTON.